(12) United States Patent
Ngai et al.

(10) Patent No.: US 10,893,453 B2
(45) Date of Patent: Jan. 12, 2021

(54) METHODS AND APPARATUS FOR MITIGATING CO-EXISTENCE ISSUES IN COMMUNICATION SYSTEMS

(71) Applicant: QUALCOMM Incorporated, San Diego, CA (US)

(72) Inventors: Francis Ngai, Louisville, CO (US); Yongsheng Shi, San Diego, CA (US); Reza Shahidi, San Diego, CA (US); Aziz Gholmieh, Del Mar, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/057,325

(22) Filed: Aug. 7, 2018

(65) Prior Publication Data
US 2019/0053115 A1 Feb. 14, 2019

Related U.S. Application Data

(60) Provisional application No. 62/543,326, filed on Aug. 9, 2017.

(51) Int. Cl.
*H04W 36/14* (2009.01)
*H04W 88/10* (2009.01)
*H04W 72/04* (2009.01)

(52) U.S. Cl.
CPC ....... *H04W 36/14* (2013.01); *H04W 72/0453* (2013.01); *H04W 72/0493* (2013.01); *H04W 88/10* (2013.01)

(58) Field of Classification Search
CPC ............. H04W 36/14; H04W 72/0453; H04W 72/0493
See application file for complete search history.

(56) References Cited

U.S. PATENT DOCUMENTS

| 2015/0222371 A1* | 8/2015 | Afkhami | H04B 17/16 455/67.13 |
| 2016/0044699 A1* | 2/2016 | Deng | H04W 52/54 370/330 |

OTHER PUBLICATIONS

China Unicom: "On NR-LTE Coexistence for NSA and SA," 3GPP Draft; R1-1711337, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017, XP051300531, 4 pages, Retrieved from the Internet: URL: http://www.3gpp.org/ftp/Meetings_3GPP_SYNC/RAN1/Docs/ [retrieved on Jun. 26, 2017].

(Continued)

*Primary Examiner* — Siming Liu

(57) ABSTRACT

Methods, systems, and devices for wireless communications are described. One method may include a wireless communications device determining an inter-modulation distortion value between simultaneous communications on a first configuration of a first radio access network and a second configuration of a second radio access network, and dynamically switching between a non-standalone mode and a standalone mode of operation, based on the inter-modulation distortion value and a quality of service requirement for the standalone mode. The wireless communications device may also provide for time division multiplexing communications on a first RAT and a second RAT wherein only the first or second RAT is active during a period of time, and wherein the first RAT is an anchor for the second RAT.

25 Claims, 14 Drawing Sheets

(56) References Cited

OTHER PUBLICATIONS

International Search Report and Written Opinion—PCT/US2018/045827—ISA/EPO—dated Nov. 16, 2018.

KT Corp: "Support of Standalone and Non-standalone NR RAN Modes," 3GPP Draft; R2-165128 NSA and SA (KT), 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016, XP051126751, 3 pages, Retrieved from the Internet: URL: http://www.3gpp.org/ftp/Meetings_3GPP_SYNC/RAN2/Docs/ [retrieved on Aug. 21, 2016].

NTT Docomo, et al., "QoS and Bearer for DC Between LTE and NR," 3GPP Draft; R2-168400_DC OPT3-3A_Bearer, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016, Nov. 4, 2016, XP051192480, 3 pages, Retrieved from the Internet: URL: http://www.3gpp.org/ftp/tsg_ran/WG2_RL2/TSGR2_96/Docs/ [retrieved on Nov. 4, 2016].

\* cited by examiner

METHODS AND APPARATUS FOR MITIGATING CO-EXISTENCE ISSUES IN COMMUNICATION SYSTEMS

CROSS-REFERENCE TO RELATED APPLICATIONS

This application claims the benefit of U.S. Provisional Patent No. 62/543,326, filed Aug. 9, 2017. The content of the provisional application is hereby incorporated by reference in its entirety.

TECHNICAL FIELD

The technology discussed below relates generally to wireless communication systems, and more particularly, to configurations for mitigating co-existence issues in communication systems such as NR and LTE systems.

INTRODUCTION

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) such as LongTerm Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may otherwise be known as user equipment (UE).

In wireless communication networks, the deployment of NR is expected to cover a wide array of spectrums. These spectrums may range from low frequency bands where mobile networks operate below 6 GHz to the mmWave spectrum. For early sub-6 GHz NR deployments, both NR and LTE are expected co-exist. Co-existence may refer a scenario where both NR and LTE systems are deployed in the same or overlapping spectrum. In such a set up, the performance of a "victim" operating band might become seriously degraded.

BRIEF SUMMARY

Techniques described below relate to improved methods, systems, devices, or apparatuses that support the mitigation of co-existence issues in communication systems. Generally, described techniques provide a method for determining an inter-modulation distortion value between communications on a first configuration of a first radio access network and communications on a second configuration of a second radio access network when transmissions occur at the same period of time on the first radio access network and the second radio access network, and dynamically switching between a non-standalone mode and a standalone mode of operation based on the inter-modulation distortion value and a quality of service requirement for the standalone mode.

In some examples, methods are disclosed for detecting a three-way concurrency of 4G connectivity+5G/NR connectivity in NSA+C-V2x, if CV2X is off, triggering 4G+NR in NSA mode, and if CV2X is on, triggering a dynamic switch from NR in NSA mode to NR in SA mode. In some examples, methods are disclosed for determining a 3 way concurrency of 4G connectivity+5G/NR connectivity in NSA+P2V, if P2V is on, triggering a dynamic switch from NSA to SA mode and turning off 4G and operating in 5G n SA mode with P2V.

In some examples, methods provide for time division multiplexing communications on a first RAT and a second RAT, wherein only the first or second RAT is active during a period of time, and wherein the first RAT is an anchor for the second RAT.

In some examples, a UE may indicate to a network, UE activity for a period of time on a first RAT, wherein scheduling to the UE is suspended on the second RAT for the period of time. In examples, signaling communications occur on the anchor RAT and data activity occurs on the second RAT. In examples, data communication is triggered at the end of the signaling communication. In further examples, communications on an uplink of a first RAT and communications on the uplink of a second RAT are mutually exclusive. In other examples, communications on a specific component carrier of a first RAT and communications on a second component carrier of a second RAT are mutually exclusive.

An apparatus for wireless communication is described. The apparatus may include means for determining an inter-modulation distortion value between communications on a first configuration of a first radio access network and communications on a second configuration of a second radio access network when transmissions occur simultaneously on the first radio access network and the second radio access network, and means for dynamically switching between a non-standalone mode and a standalone mode of operation based on the inter-modulation distortion value and a quality of service requirement for the standalone mode.

In some examples, the apparatus may include means for detecting a three-way concurrency of 4G connectivity+5G/NR connectivity in NSA+C-V2x, if CV2X is off, triggering 4G+NR in NSA mode, and if CV2X is on, triggering a dynamic switch from NR in NSA mode to NR in SA mode. In some examples, the apparatus may include means for determining a 3 way concurrency of 4G connectivity+5G/NR connectivity in NSA+P2V, if P2V is on, means for triggering a dynamic switch from NSA to SA mode and means for turning off 4G and operating in 5G n SA mode with P2V.

In some examples, the apparatus may include means for time division multiplexing communications on a first RAT and a second RAT, wherein only the first or second RAT is active during a period of time, and wherein the first RAT is an anchor for the second RAT.

In some examples, the apparatus may include means for a UE to indicate to a network, UE activity for a period of time on a first RAT, wherein scheduling to the UE is suspended on the second RAT for the period of time. In examples, signaling communications occur on the anchor RAT and data activity occurs on the second RAT.

Another apparatus for wireless communication is described. The apparatus may include a processor, memory in electronic communication with the processor, and instructions stored in the memory. The instructions may be operable to cause the processor to determine an inter-modulation distortion value between communications on a first configuration of a first radio access network and communications on a second configuration of a second radio access network when transmissions occur at the same period of time on the first radio access network and the second radio access network, and dynamically switch between a non-standalone mode and a standalone mode of operation based on the inter-modulation distortion value and a quality of service requirement for the standalone mode.

In some examples, the instructions may be operable to cause the processor to detect a three-way concurrency of 4G connectivity+5G/NR connectivity in NSA+C-V2x, if CV2X is off, trigger 4G+NR in NSA mode, and if CV2X is on, trigger a dynamic switch from NR in NSA mode to NR in SA mode. In some examples, the instructions may be operable to cause the processor to determine a 3 way concurrency of 4G connectivity+5G/NR connectivity in NSA+P2V, if P2V is on, trigger a dynamic switch from NSA to SA mode and turn off 4G and operating in 5G n SA mode with P2V.

In some examples, the apparatus may include means for time division multiplexing communications on a first RAT and a second RAT, wherein only the first or second RAT is active during a period of time, and wherein the first RAT is an anchor for the second RAT.

In some examples, the instructions may be operable to cause the processor to indicate to a network, UE activity for a period of time on a first RAT, wherein scheduling to the UE is suspended on the second RAT for the period of time. In examples, signaling communications occur on the anchor RAT and data activity occurs on the second RAT.

A non-transitory computer-readable medium for wireless communication is described. The non-transitory computer-readable medium may include instructions operable to cause a processor to determine an inter-modulation distortion value between communications on a first configuration of a first radio access network and communications on a second configuration of a second radio access network when transmissions occur at the same period of time on the first radio access network and the second radio access network, and dynamically switch between a non-standalone mode and a standalone mode of operation based on the inter-modulation distortion value and a quality of service requirement for the standalone mode.

In some examples, the instructions may be operable to cause the processor to detect a three-way concurrency of 4G connectivity+5G/NR connectivity in NSA+C-V2x, if CV2X is off, trigger 4G+NR in NSA mode, and if CV2X is on, trigger a dynamic switch from NR in NSA mode to NR in SA mode. In some examples, the instructions may be operable to cause the processor to determine a 3 way concurrency of 4G connectivity+5G/NR connectivity in NSA+P2V, if P2V is on, trigger a dynamic switch from NSA to SA mode and turn off 4G and operating in 5G n SA mode with P2V.

In some examples, the apparatus may include means for time division multiplexing communications on a first RAT and a second RAT, wherein only the first or second RAT is active during a period of time, and wherein the first RAT is an anchor for the second RAT.

In some examples, the instructions may be operable to cause the processor to indicate to a network, UE activity for a period of time on a first RAT, wherein scheduling to the UE is suspended on the second RAT for the period of time. In examples, signaling communications occur on the anchor RAT and data activity occurs on the second RAT.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur.

Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide various methods and apparatus for mitigating co-existence issues such as inter-modulation distortion (IMD) in communications systems. Example systems include a communication network operating as an anchor to another network. Exemplary systems may include a 4G/LTE network acting as an anchor to a 5G/NR network, or vice versa.

Figure 1:
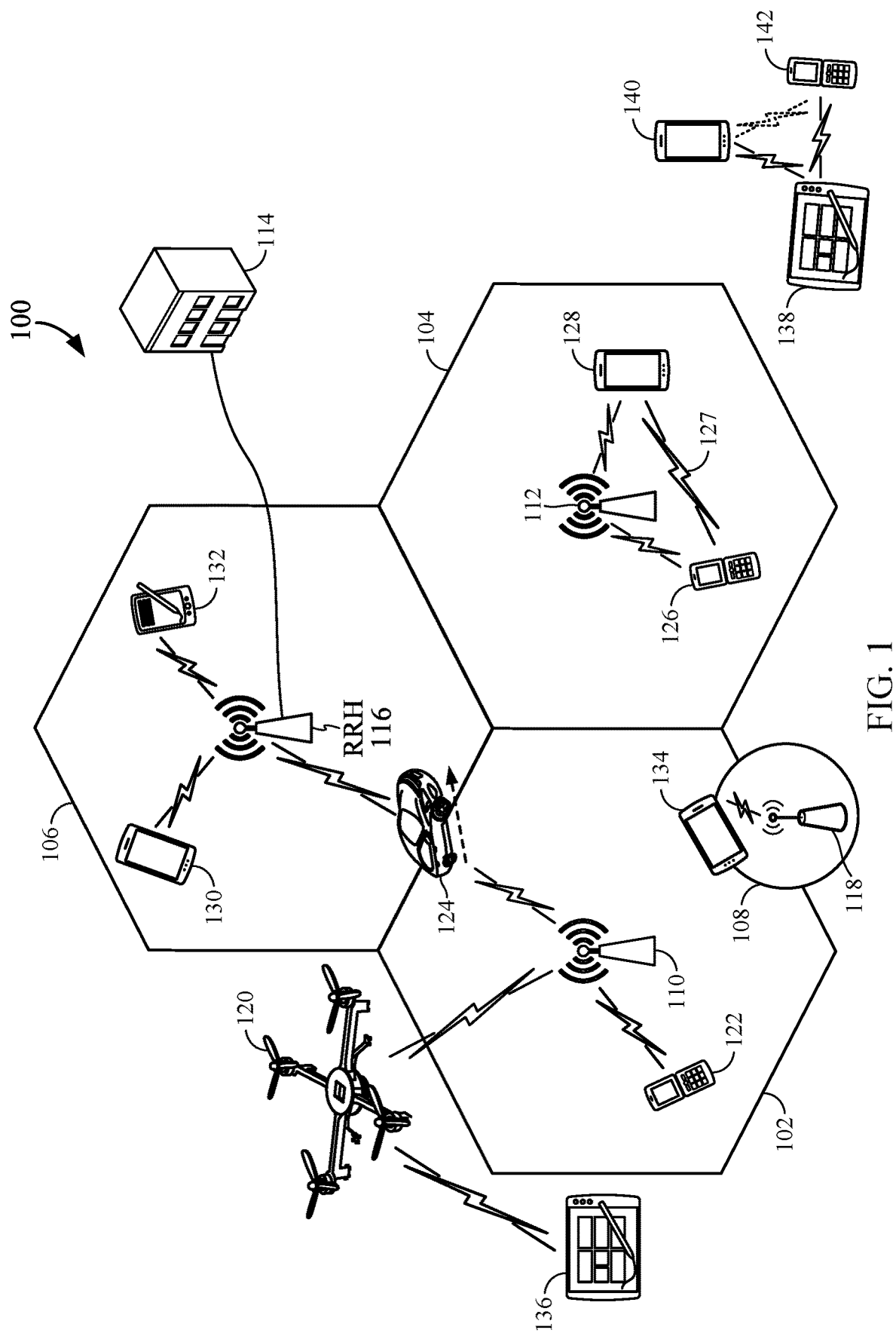
FIG. 1 is a conceptual diagram illustrating an example of a radio access network (RAN) that supports techniques for mitigating co-existence issues in communications systems in accordance with aspects of the present disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions or cells. These cells may be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector may be identified by a single logical identification belonging to that sector. In a cell that is divided into sectors, the multiple sectors within a cell may be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station may have an integrated antenna or may be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses. In some examples, base stations may support different radio access technologies (e.g., UMTS, LTE, 5G New Radio (NR)).

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor or measure various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Thus, in a wireless communication network with scheduled access to time-frequency resources and having a cellular configuration, a P2P configuration, or a mesh configuration, a scheduling entity and one or more scheduled entities may communicate utilizing the scheduled resources.

The air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes. Various implementations of scheduling entities 202 and scheduled entities 204 may include suitable hardware and capabilities (e.g., an encoder, a decoder, and/or a CODEC) to utilize any one or more of these error correcting codes for wireless communication.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

Figure 2:
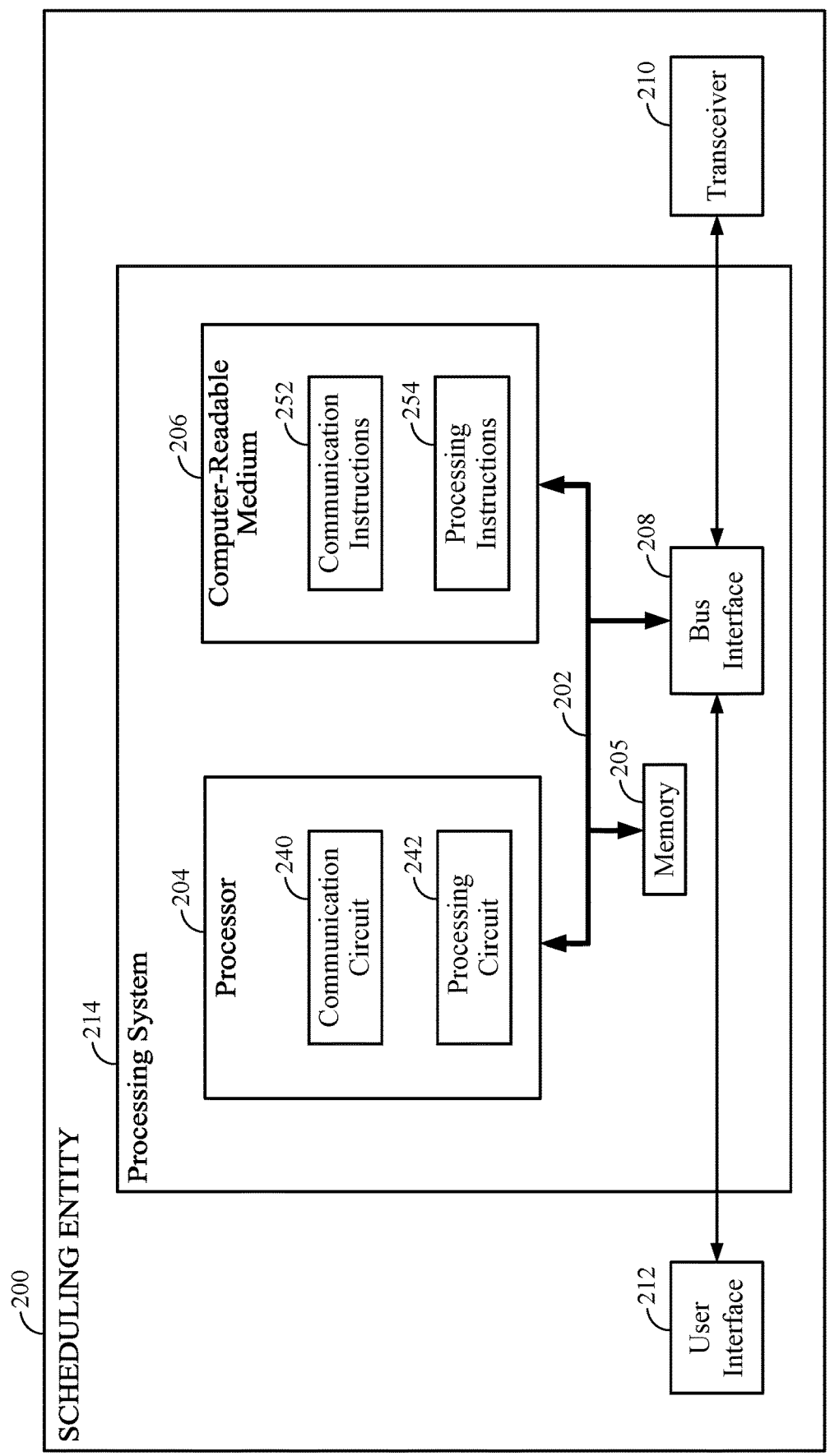
FIG. 2 is a block diagram illustrating an example of a hardware implementation for a scheduling entity employing a processing system that supports techniques for mitigating co-existence issues in communications systems in accordance with aspects of the present disclosure.

FIG. 2 is a block diagram illustrating an example of a hardware implementation for a scheduling entity 200 employing a processing system 214. For example, the scheduling entity 200 may be a base station as illustrated in FIG. 1. In another example, the scheduling entity 200 may be a UE as illustrated in FIG. 1.

The scheduling entity 200 may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 200 may be configured to perform any one or more of the functions described herein. That is, the processor 204, as utilized in a scheduling entity 200, may be used to implement any one or more of the processes and procedures described below.

In this example, the processing system 214 may be implemented with a bus architecture, represented generally by the bus 202. The bus 202 may include any number of interconnecting buses and bridges depending on the specific application of the processing system 214 and the overall design constraints. The bus 202 communicatively couples together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a communication interface or means for communicating with various other apparatus over a transmission medium. Depending upon the nature of the apparatus, a user interface 212 (e.g., keypad, display, speaker, microphone, joystick) may also be provided.

In some aspects of the disclosure, the processor 204 may include various circuitry configured to implement one or more of the functions described below.

The processor 204 is responsible for managing the bus 202 and general processing, including the execution of software stored on the computer-readable medium 206. The software, when executed by the processor 204, causes the processing system 214 to perform the various functions described below for any particular apparatus. The computer-readable medium 206 and the memory 205 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 206 may include software configured to implement one or more of the functions described herein.

Figure 3:
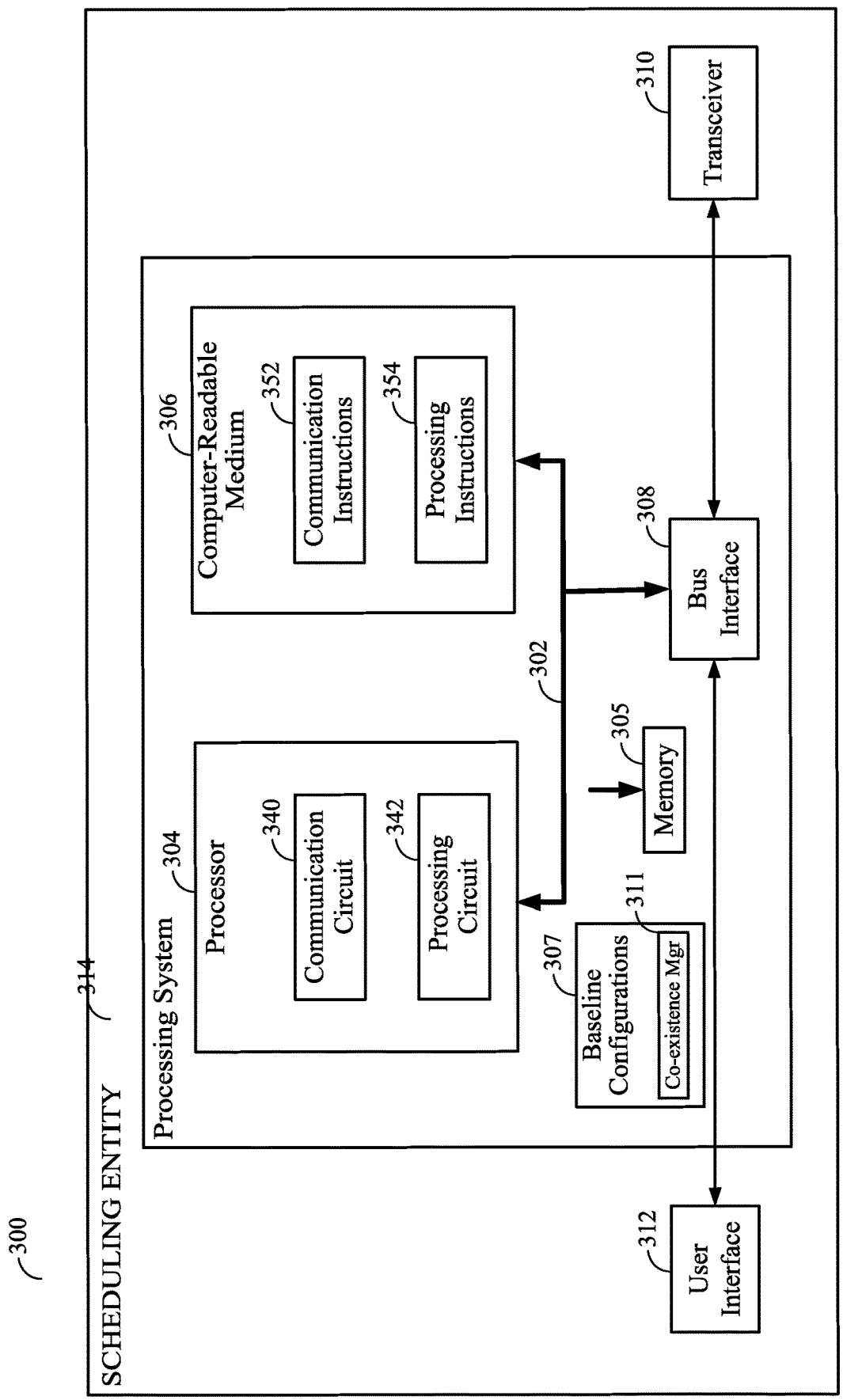
FIG. 3 is a block diagram illustrating an example of a hardware implementation for a scheduled entity employing a processing system that supports techniques for mitigating co-existence issues in communications systems in accordance with aspects of the present disclosure.

FIG. 3 is a conceptual diagram illustrating an example of a hardware implementation for an exemplary scheduled entity 300 employing a processing system 314. In accordance with various aspects of the disclosure, an element, or any portion of an element, or any combination of elements may be implemented with a processing system 314 that includes one or more processors 304. For example, the scheduled entity 300 may be a user equipment (UE) as illustrated in FIG. 1.

The processing system 314 may be substantially the same as the processing system 314 illustrated in FIG. 3, including a bus interface 308, a bus 302, memory 305, a processor 304, and a computer-readable medium 306. Furthermore, the scheduled entity 300 may include a user interface 312 and a transceiver 310 substantially similar to those described above in FIG. 3. That is, the processor 304, as utilized in a scheduled entity 300, may be used to implement any one or more of the processes described herein. A plurality of baseline configurations 307 (e.g., RRC configurations or connection configurations) may be stored at the processing system, for example, in the memory 305 and/or computer-readable medium 306. The baseline configurations 307 may be used to configure the connections between the scheduled entity and a network (e.g., cells). The baseline configurations may include a co-existence manager 311 that generates a message that is sent to the network not to invoke a particular band or to invoke a particular band.

In some aspects of the disclosure, the processor 304 may include various circuitry configured to implement one or more of the functions described herein.

In some aspects of the disclosure, base stations (e.g., eNB and gNB) of the access network 100 may use RRC reconfiguration messages to send channel parameters to the UEs. Then, the UE may apply the received parameters to its L1 and/or L2 entities to establish one or more channels or connections with the network. The reconfiguration message may be a dedicated message that is UE specific. In some examples, a majority of parameters contained in the reconfiguration messages may be identical for all UEs receiving the messages within an area that may include a number of cells or base stations. Non-limiting examples of these parameters may include MAC main configuration parameters, packet data convergence protocol (PDCP) configuration parameters, radio link control (RLC) configuration parameters, etc. Other exemplary parameters may include radio resource parameters (e.g., as defined in 3GPP TS 36.331) that may be the same for all UEs in the same area. In some examples, the RRC reconfiguration messages may have a large number of parameters that are the same for all UEs even in LTE networks supporting carrier aggregation (CA) and dual-connectivity (DC). For example, the UEs in the same area may get the same secondary cell (Scell) configurations.

Figure 4:
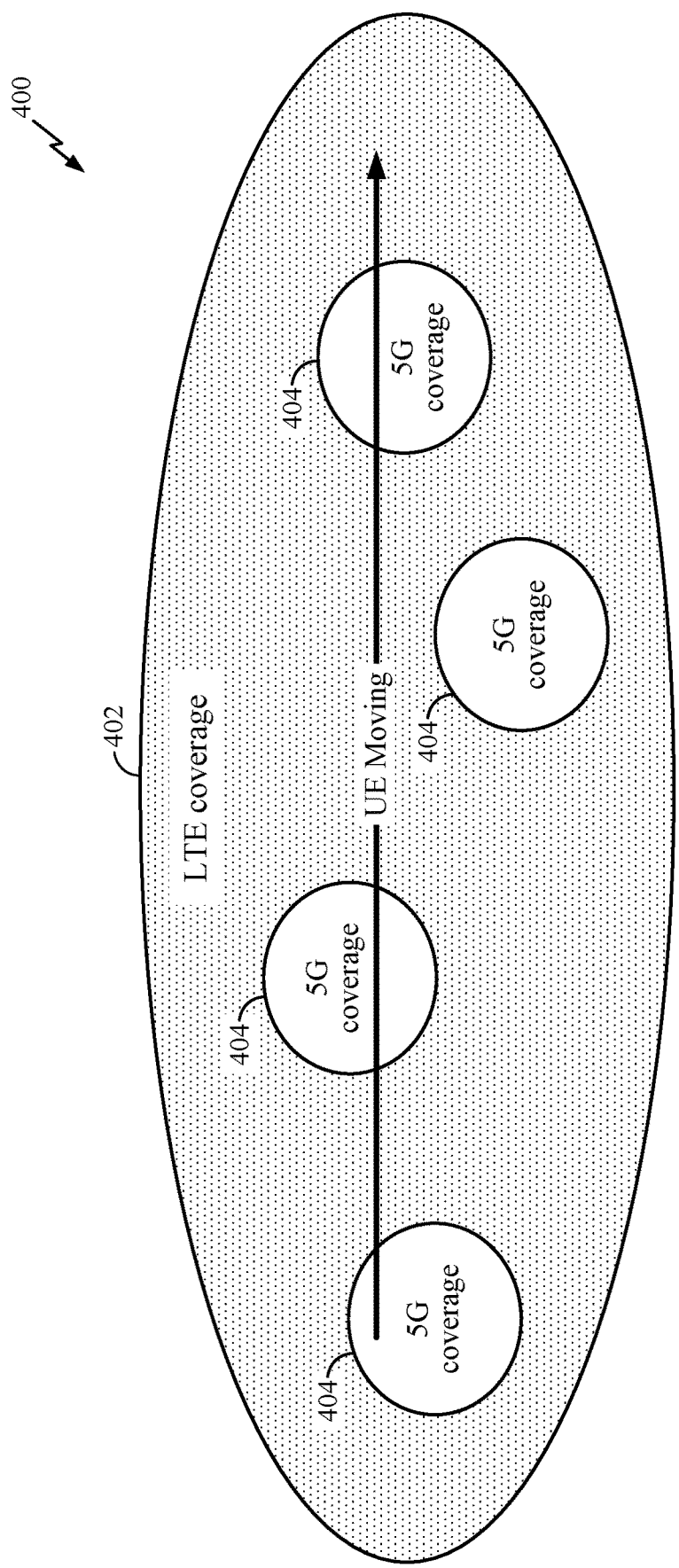
FIG. 4 is a diagram illustrating an exemplary network implemented in a non-standalone (NSA) mode including 4G/LTE and 5G/NR cells according to some aspects of the disclosure.

FIG. 4 is a diagram illustrating an exemplary network 400 implemented in a non-standalone (NSA) mode including 4G and 5G cells according to some aspects of the disclosure. NSA mode may refer to E-UTRAN NR Dual Connectivity where a UE is configured by a network to have concurrent or simultaneous connectivities to LTE and 5G/NR. In the NSA mode, a 4G/LTE cell 402 may act as the control plane anchor point, and 5G cells 404 may be added or removed using a procedure similar to an LTE dual-connectivity (LTE-DC) procedure. In standalone (SA) mode, 5G/NR may be deployed without dependencies on the LTE network.

Alternatively, in NSA mode, 5G/NR may use the existing 4G evolved packet core. In this scenario, 5G/NR may provide extra user plane capacity while the 4G/LTE network is used as a primary cell and for control plane messaging to set up and manage sessions and mobility. In the example of FIG. 4, when a UE moves through the network from left to right in the figure, 5G cells are added and removed from the UE's connections with the network. In this example, the LTE cell 402 provides the signaling or control plane connection, and the 5G cells may provide faster data connections with the network.

In the exemplary network 400 of FIG. 4, 5G/NR and 4G/LTE operating bands may co-exist or transmit at the same time, causing performance of a "victim" operating band to become seriously degraded. This may be referred to as co-existence or IMD. In this example the 4G/LTE cell or network might operate in a frequency division duplex (FDD) mode, where the uplink is one band (e.g. 10 MHz wide at 2.600 GHz) and the paired downlink is another band, e.g. 10 MHz at a separated frequency (eg 2.720 GHz). In this configuration, LTE transmits and receives at the same time. Alternatively, the LTE network may operate in a time division duplex (TDD) mode meaning the network uses one band and switches between up and down. Co-existence issues or IMD may arise when LTE operates on an FDD band concurrent with NR operating on a TDD band. In such a scenario, IMD may occur on a receive communication of the LTE network or alternatively, on a receive communication of the NR network. In another scenario, the 4G/LTE cell may transmit a voLTE call to a user such as a UE, and the NR cell may concurrently transmit a high data rate data call, thus heightening co-existence issues. Methods and apparatus are disclosed herein which enable mitigation of these co-existence issues.

NSA configurations may be deployed to ensure robust and consistent coverage for a user/UE where NR coverage is not consistently available. In an exemplary embodiment, a 4G/LTE cell may act as an anchor network for NR. It is anticipated that, as NR coverage matures, dynamic switching between NSA mode and SA mode will provide efficiencies in intermodulation distortion mitigation, as discussed herein. When two technologies, for example, a 4G/LTE anchor network and 5G/NR, are concurrently active (active at the same time) it may be determined that the NR network meets all QoS requirements needed by a user. If this is the case, a dynamic switch from NSA mode to SA mode may be triggered to mitigate co-existence problems or IMD. This may occur by temporarily suspending, disabling or reducing the usage of one technology/network e.g the 4G anchor network. In some examples, the non-critical communication (which happens to be "the aggressor") may be temporarily suspended, disabled, or reduced to mitigate IMD by dynamically switching between NSA and SA mode when SA mode is available for NR. Dynamic switching occurs without interruption in connectivity, i.e dynamic switching does not require a UE to detach from NSA and re-attach in SA mode.

In one example, as illustrated in FIG. 4, it may be determined that when a UE 404 moves into a specific coverage area, radio frequency (RF) band combinations of (4G and 5G/NR), become problematic or create coexistence issues or IMD. In this scenario, the network 402 may initiate methods to avoid problematic RF band combinations in the first place, or the network 402 or UE 404 may trigger a dynamic switch from 5G/NR NSA mode to 5G/NR SA mode to remove the UE 404 from the 4G network 402. In either scenario, the UE 404 is then able to reap the full benefits of throughput and low latency provided by 5G/NR.

For example, in FIG. 4, it may be determined that a UE 404 has moved into a coverage area of a first network, such as a 4G anchor network operating on a first band, e.g. "Band A" and a second network, such as a 5G/NR network, operating on a second band, e.g. "Band B" and it is further determined that this RF band combination results in IMD. In other words, IMD is detected in FDD 4G UL+5G/NR UL NSA mode. In this scenario, the network may de-sense 4G DL communications on Band A to mitigate IMD or de-sense FDD 4G DL by triggering a dynamic switch from NSA to SA mode which removes 4G from the UE. In some examples, it is assumed NSA is invoked as much as possible. Note the UE may assist the network to trigger a dynamic switch between NSA and SA mode. For example, a UE may send a message to the network to trigger a switch from NSA to SA mode. By switching to SA mode, NR is maintained in mitigation, such that the UE continues to reap the full benefit in throughput and low latency provided by 5G/NR. Alternatively, the network may have a priori knowledge that a combination of the 4G anchor network operating on certain frequencies in Band A and a 5G/NR network operating Band B is problematic and may avoid this combination altogether.

For purposes of further illustration, as shown in Table 1 below, assume 4G on Band A and NR on Band B results in IMD de-sensing 4G DL on Band A. A UE may operate on certain frequencies on the 4G anchor that are on band A while the UE remains out of NR coverage. However, as the UE moves, the network may require the UE to make measurements on the 5G/NR Band B whilst still in the coverage of 4G Band A. In this example, with a priori knowledge that communication on 4G Band A+NR Band B is problematic, the network may determine not to invoke 4G Band A+NR Band B, but instead may trigger a dynamic switch from NSA mode to SA mode and then perform a handover from 4G Band A to NR Band B. Thus, the UE will no longer be on 4G and will only be on 5G.

Continuing with this example, the UE may proceed to leave the coverage area of NR on Band B and may remain in the coverage of 4G Band A. Once again, with a priori knowledge that 4G Band A+NR Band B is problematic, the network may avoid invoking 4G Band A+NR Band B by performing a handover from NR on Band B (still in SA mode) to 4G on Band A. Assuming the UE is now out of 5G coverage, a dynamic switch from SA mode back to NSA mode may be triggered to return to communications on Band A in SA mode (with no 5G coverage.) This example is summarized in Table 1 below.

TABLE 1

| Step | 4G Anchor | 5G/NR | NSA vs SA | Change/Next |
|---|---|---|---|---|
| 1.1 | Serving frequency is in Band A | OOS | NSA | 5G/NR measurements indicate UE is in coverage of Band B |
| 1.2 | Serving Frequency is in Band A | 5G/NR measurements indicate UE is in coverage of Band B | NSA | Network discerns (potentially via IDC) RF coex issue if 4G is on Band A and 5G/NR in NSA |

TABLE 1-continued

| Step | 4G Anchor | 5G/NR | NSA vs SA | Change/Next |
|---|---|---|---|---|
| | | | | mode is in Band B. Network triggers dynamic switch from NSA to SA, performs handover from 4G to 5G/NR with serving frequency from Band B assigned to 5G/NR |
| 1.3 | NA | Serving frequency is in Band B | SA | UE leaving coverage of band B for 5G/NR but remains in coverage of 4G Band A. Network performs handover from 5G/NR to 4G with serving frequency from Band A assigned to 4G, and triggers dynamic switch from SA to NSA |
| 1.4 | Serving frequency is in Band A | OOS | NSA | |

In yet another example, as shown in Table 2, assume a combination of a Band A on a 4G anchor network and a Band B on a 5G/NR network results in co-existence issues or IMD, but a combination of Band A on 4G and Band C on 5G/NR is does not result in co-existence issues. Assume further, that a UE communicates with the network in NSA mode. Referring to FIG. 4, NR measurements may indicate the UE is leaving the coverage of Band C and moving into to a coverage area of Band B. In this example, the network may discern e.g. via an IDC message that 4G Band A+NR Band B is problematic. In one embodiment of disclosed examples, the network may de-activate or de-configure 5G/NR on Band C (first remove NR on band C, so only 4G on Band A remains), trigger a dynamic switch from NSA to SA, and then perform handover to 5G/NR on Band B. Thus, communication may continue on 4G Band A+NR Band C when available, and communication on the combination of 4G Band A+NR Band B is avoided. In other words, upon IMD detection, NR Band C may be removed, communications may be reduced to 4G Band A only in SA mode, and then a handover from 4G on Band A directly to 5G on Band B is performed. See Option 2.2.1 of Step 2.2 of Table 2 below.

In another embodiment, the network may de-activate Band A on the 4G anchor network so that communication on NR Band C in standalone mode remains, then perform handover from NR on Band C to NR on Band B. Here again, RF band combinations invoking 4G Band A+NR Band B are avoided. In this example, communications began on 4G Band A+NR Band C and ended up on Band B only. See option 2.2.2 of step 2.2 of Table 2 below.

To illustrate further, assume the UE communicating on NR Band B in SA mode leaves the coverage area of Band B but remains in the coverage of Band A of 4G and NR Band C. Again, the UE may go from NR on B to 4G on Band A in NSA and then add NR Band C to go back to communications on 4G Band A+NR Band C. Alternatively, the UE may go from NR on Band B in SA to NR on band C in SA then switch from NR on Band C SA mode to 4G Band A+NR Band C in NSA mode. Again, communication on 4G Band A+NR Band B is avoided. Refer again to Table 2 below.

TABLE 2

| Step | 4G Anchor | 5G/NR | NSA vs SA | Change/Next |
|---|---|---|---|---|
| 2.1 | Serving frequency is in Band A | Serving frequency is in Band C | NSA | 5G/NR measurements indicate UE is leaving coverage of Band C but is in coverage of Band B |
| 2.2 | Serving Frequency is in Band A | 5G/NR measurements indicate UE is leaving coverage of Band C but is in coverage of Band B | NSA | Network discerns (potentially via IDC) RF coex issue if 4G is on Band A and 5G/NR in NSA mode is in Band B. Option 2.2.1 - Network de-activates/de-configures 5G/NR on Band C (only 4G on Band A |

TABLE 2-continued

| Step | 4G Anchor | 5G/NR | NSA vs SA | Change/Next |
|------|-----------|-------|-----------|-------------|
| | | | | remains), triggers switch from NSA to SA, and performs handover to 5G/NR on Band B Option 2.2.2 - Network triggers dynamic switch from NSA to 5G/NR SA on Band C, and performs 5G/NR handover from Band C to Band B |
| 2.3 | NA | Serving frequency is in Band B | SA | UE moves outside coverage of Band B for 5G/NR, and re-enters coverage of Band C, and 4G remains in coverage of Band A Option 2.3.1 - Network performs handover from 5G/NR to 4G on Band A, triggers dynamic switch from SA to NSA, and configures/activates 5G/NR on Band C Option 2.3.2 - Network performs 5G/NR handover from Band B to Band C, triggers dynamic switch from SA to NSA with 4G anchor on Band A |
| 2.3 | NA | OOS | NSA | |
| 2.4 | Serving frequency is in Band A | Serving frequency is in Band C | NSA | |

In some examples, an in-device co-existence (IDC) mechanism or message may be used to "blacklist" problematic band combinations. This mechanism detects IDC interference. For instance, assume communications on 4G Band A+NR Band B in NSA mode trigger co-existence issues, but communications on 4G Band A+NR Band C do not cause co-existence issues. Here, the anchor may be on Band A of the 4G network. Assuming a UE has moved out of NR coverage and NW inter-frequency measurements are on 5G NR Band B and Band C, an IDC message may be sent to the network to indicate the communications on 4G Band A+ and NR Band B is problematic or causes IDC interference. A message may be sent to the network not to invoke 4G Band A+NR Band B. This may be considered a blacklist to the network. Further, it may be indicated to the network that communications on 4G Band A are acceptable, communications on NR Band B in NSA mode is acceptable, but communications on 4G Band A+NR Band B is problematic.

In some examples, an IDC mechanism/message may have several ways of reporting IMD. For example, the network may send a message not to invoke 4G Band A+NR Band B. In another example, while the network is operating on Band A, it might be sent a message not to invoke NR Band B to avoid a concurrency of 4G Band A and NR Band B. Alternatively, given the UE has a serving frequency of 4G Band A, the UE may send a message to the NW not to invoke NR Band B on NR for a specific period of time.

In one embodiment, a UE may communicate on Band X and the network may communicate to the UE to perform measurements on Band A of the 4G network and Band B of the NR network. Here, the UE may send a message to the NW to indicate communication on a combination of 4G Band A+NR Band B is problematic and thus should not be triggered. In another embodiment, the network may have a priori knowledge that communications on 4G Band A+NR Band B is problematic. In this case, if a UE is on Band A, for instance, additional information may be sent to the UE that Band B should not be used. Here, it is not explicitly called out that the UE should not communicate on a combination of 4G Band A and NR Band B. Instead, it is indicated to the UE not communicate on NR Band B given the UE is on 4G Band A. In this embodiment, every time the band on 4G changes, updated messages may be sent to the network or UE. When the UE is on 4G Band A, and the network triggers measurements on NR Band B and NR Band C, the UE might indicate to the NW to blacklist communications on 4G Band A+NR Band B. Thus, even though measurements from the UE to the NW indicate the UE is in the coverage of NR Band B, given the blacklist provided by UE to the NW, NR will not be invoked on Band B. Here, the NW does not invoke 4G Band A+NR Band B.

Assume the UE moves, and now, besides being in the coverage of Band B, the UE is also now in the coverage of Band Band C. Since NR band C is not on the blacklist, the NW may proceed with configuring and activating 5G NR on Band C so that 4G Band A+NR Band C is enabled. Assume now, the UE leaves the coverage of NR on Band C. A priori knowledge of the NW (even though the NW may perform A+B) where the UE indicated combinations of 4G Band A+NR Band B are blacklisted, results in the UE being configured to be on 4G Band A only when the UE is outside the coverage of NR Band C, since the NR Band B may not be invoked.

In another aspect of present examples, switching between SA mode and NSA mode may be triggered for resource sharing purposes. For instance, there may be scenarios when SA mode operation is preferred over NSA mode operation, e.g. to free up resources for more complicated use cases. In some examples, cellular V2X, a vehicle to vehicle direct communications technology is enabled for autonomous driving. Cellular V2X incorporates several features, including vehicles broadcasting their current positions to other vehicles in the vicinity. The same chipset may support C-V2X as well as WAN connectivity. In some examples, chipsets may be enabled with 4G WAN connectivity+5G WAN connectivity in NSA, 4G connectivity WWAN+C-V2X connectivity, or 5G/NR WWAN SA connectivity+C-V2X. Chipsets may not support a 3-way concurrency of 4G WWAN connectivity+5G/NR WWAN connectivity in NSA+C-V2x. Thus, in one embodiment of resource sharing, when C-V2X is off, 4G+NR in NSA mode may be enabled. When C-V2X is on, a dynamic switch of NR from NSA mode to SA mode may be triggered. In this example, it is assumed that NSA mode is advantageous over SA mode. Here, if SA mode is supported, dynamic switching between NSA and SA mode may be triggered, such that when CV2X comes on and when the user or UE is in 5G coverage, 4G may be de-activated. See Table 3.

TABLE 3

| C-V2X ON vs OFF | 5G/NR WWAN in SA or NSA |
|---|---|
| OFF | NSA |
| ON | SA |

In other examples involving Pedestrian to Vehicle (P2V) communications, a handset may periodically broadcast its position to nearby vehicles. Similarly, a chipset, may not support 4G connectivity+5G connectivity NSA+Pedestrian to Vehicle (P2V). Thus, when P2V is on, if dynamic switching between NSA mode and SA mode is supported, 5G may not be disabled all the time, when P2V comes on. Instead, 4G may be disabled, then 5G connectivity in SA mode with P2V may be used. See Table 4.

TABLE 4

| P2V ON vs OFF | 5G/NR WWAN in SA or NSA |
|---|---|
| OFF | NSA |
| ON | SA |

In another aspect of disclosed examples, as opposed to blacklisting an entire frequency channel, a specific set of frequencies within a frequency channel may be blacklisted. In examples, 100 MHz bandwidth may be allocated for Sub6 and up to 400 MHz bandwidth may be allocated for mmWave. In examples, only a subset of frequencies in each bandwidth, e.g. in the 100 MHz bandwidth (Sub6) or the 400 MHz bandwidth (mmWave) may have a RF coexistence issues. When only a subset of frequencies in a channel have RF coexistence issues, it may not be advantageous to apply Tx power limit backoff, Rx/Tx blanking or TDM on an entire channel as mitigation. Disclosed examples enable a UE to use IDC messages to blacklist certain frequencies within a channel. In other words, bandwidth reduction on specific frequencies may be performed. This may result in mitigating RF coexistence issues with less expensive RF filters to isolate the RAT's involved. See for instance, FIG. 5.

Figure 5:
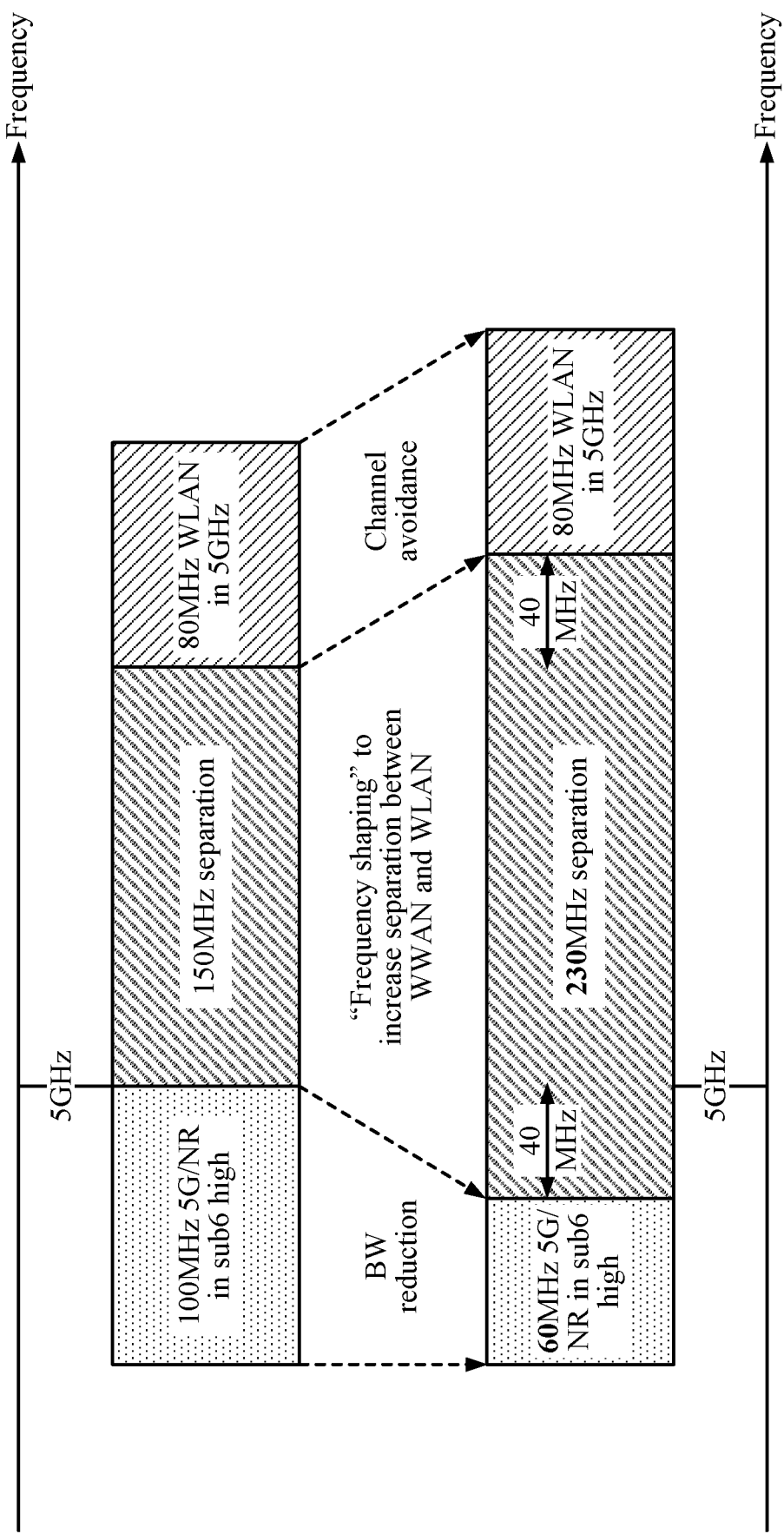
FIG. 5 is a diagram illustrating exemplary communication bands that support techniques for mitigating co-existence issues in communications systems in accordance with aspects of the present disclosure.

As illustrated in FIG. 5, frequency bands e.g. just below 5 GHz may be used for NR communications and a 5 GHz WLAN may operate slightly above the 5 GHz range. In some scenarios, this may give rise to co-existence issues or IMD. Typically, NR may receive or transmit all the way up to 5 GHz. In one embodiment, NR may simply not use e.g. the last portion of the allocated channel. Thus, the NR network may be assigned just the first 60 MHz of the original 100 MHz channel. Put differently, the network may be conditionally told not to use the last 40 MHz of the channel. This scenario may be referred to as BW reduction from e.g. 100 mHz to 60 mHz. In one example, BW reduction may entail specifically shaving off 40 mhz from the high side of a channel. In other examples, frequencies in the middle of a channel may be blacklisted e.g. 40 mhz in the middle of the channel may be blacklisted, leaving leave 30 mhz on each side, usable for communication. In some examples, a UE may use an IDC message to blacklist specific frequencies in the middle of a channel. In yet other examples, certain frequencies may be blacklisted from either edge of a channel. This process may be referred to as frequency shaping. IN some examples, frequency shaping may be used to increase the separation between WWAN and WLAN.

In yet another aspect of present examples, time division multiplexing (TDM) may be applied to communications on a first anchor network and a second network such that, at any given time, only one RAT is active. A UE may indicate to the NW that it will be active on a particular RAT for a specified duration of time and may request that nothing be scheduled on the other RAT. For instance, a UE may indicate it is receiving signaling on an LTE side, (this may be important to control the UE) and may elect to sacrifice data on an NR side for the duration of the signaling. In this scenario, the NW will not schedule any data activity on NR until signaling is been completed on the LTE network. Once signaling is done, NR data transfer may be resumed. This may be UE indicated in some embodiments or NW controlled in other embodiments. A NW may, based on current knowledge give a RAT resources and essentially suspend another RAT.

In one embodiment, the downlink (DL) and the uplink (UL) are time division multiplexed, or operate in a mutually exclusive manner. In another example, only the UL of a first RAT or network and the UL of a second RAT or network operate on a mutually exclusive manner or are time division multiplexed. In other scenarios, only a specific component carrier (the component carrier could be on a DL or on an UL) of the first RAT or network is time division multiplexed with another specific component carrier of the second RAT or network. In some examples, time division multiplexing may not be associated with a pre-determined period or pattern. In other words, mutual exclusivity between two RATS may be on a more ad hoc basis or on demand. For instance, at a given moment in time, or at time t, it may be determined to suspend one RAT or network for a period of x or a period of x seconds or milliseconds while a second RAT or network communicates. After this time period, the first RAT may resume communication.

In disclosed examples, ad hoc mutual exclusivity may be supported on a RAT or network level, or on an UL of a first RAT or network and the UL of a second RAT or network, or on a specific component carrier of a first RAT or network and another specific component carrier of a second RAT or network. In this example, this may be enabled only under certain conditions. In another aspect of disclosed examples, ad hoc scenarios may require a UE to inform an eNB or gNB of these events.

Figure 6:
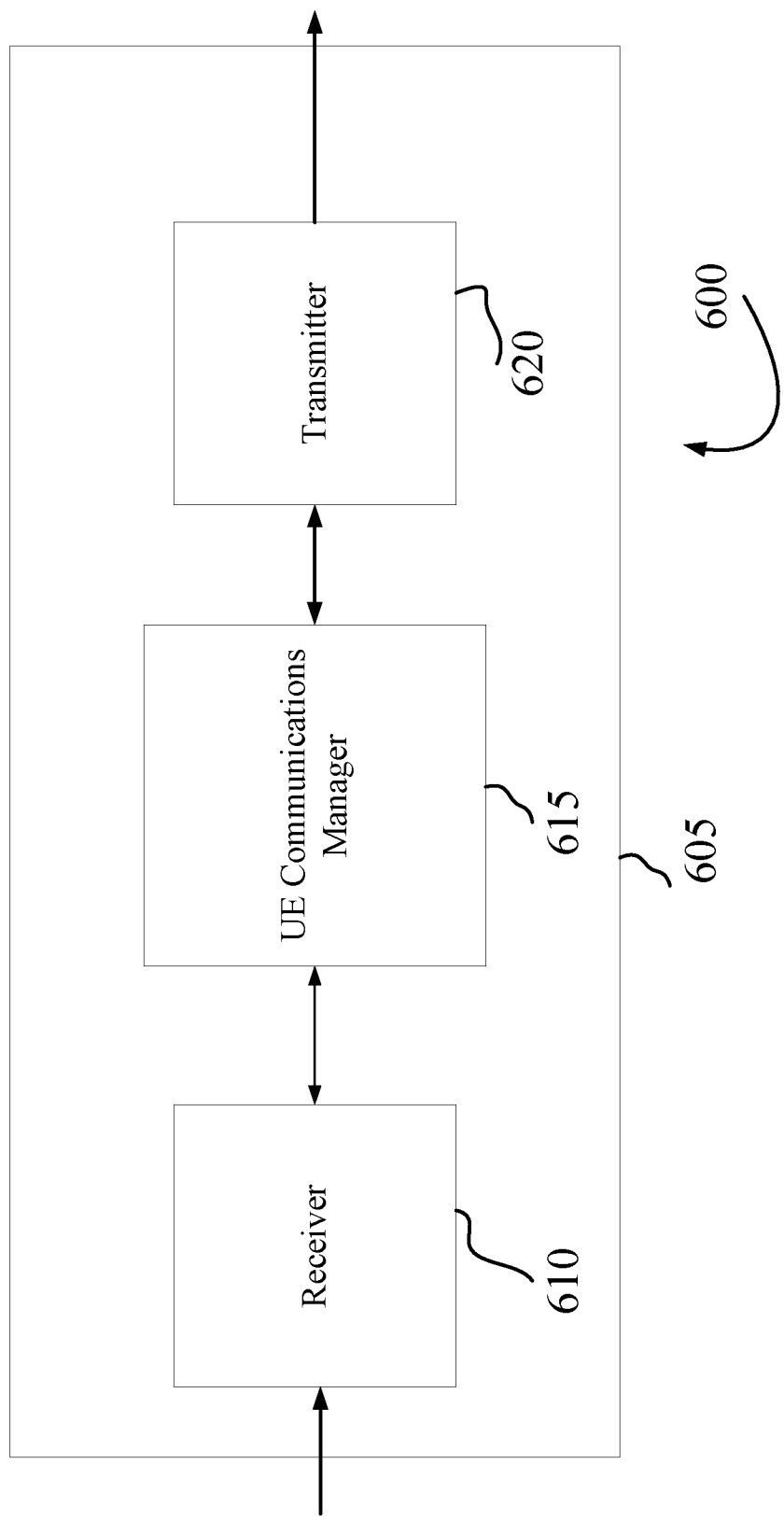
FIG. 6 illustrates a block diagram of a system including a UE that supports techniques for mitigating co-existence issues in communications systems in accordance with aspects of the present disclosure.

FIG. 6 illustrates an example block diagram that supports techniques for mitigating co-existence issues in communications systems, in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CQI reporting, throughput indicators, priority indicators, etc.) Information may be passed on to other components of the device. The receiver 610 may utilize a single antenna or a set of antennas.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. In some examples, UE communications manager 615 may indicate to a network, UE activity for a period of time on a first RAT.

Transmitter 620 may transmit signals generated by other components of the device. In some examples, the transmitter 620 may be collocated with a receiver 610 in a transceiver module. The transmitter 620 may utilize a single antenna or a set of antennas.

Transmitter 620 may transmit a signal indicative to the network not to invoke a particular band or to invoke a particular band.

Figure 7:
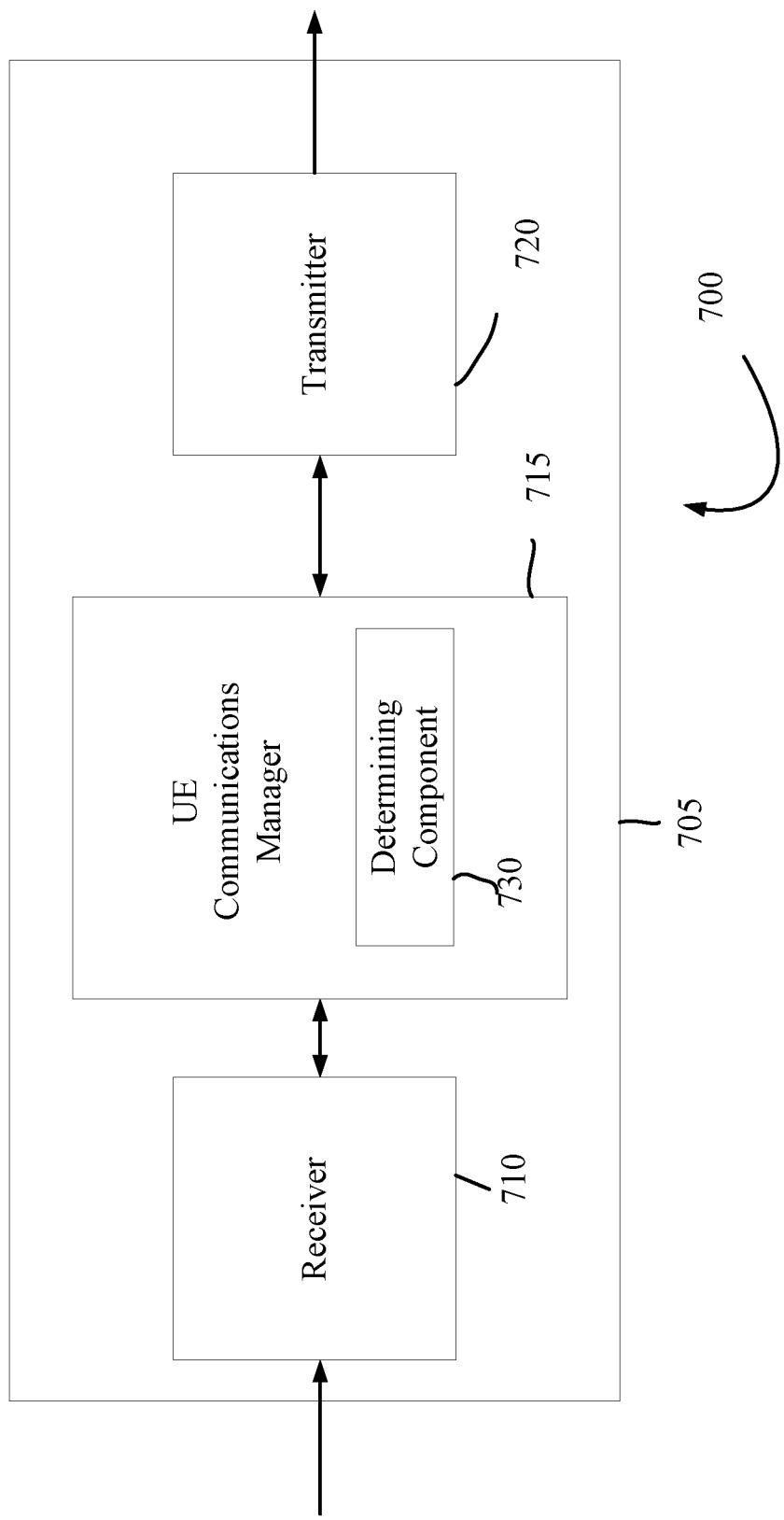
FIG. 7 illustrates a block diagram of a system including a UE that supports techniques for mitigating co-existence issues in communications systems in accordance with aspects of the present disclosure.

FIG. 7 shows a block diagram 700 of a wireless device 705 that supports techniques for mitigating co-existence issues in communication systems in accordance with aspects of the present disclosure. Wireless device 705 may be an example of aspects of a wireless device 605 or a UE 115 as described with reference to FIG. 6 or FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and CQI reporting, throughput indicators, priority indicator, etc.) Information may be passed on to other components of the device. The receiver 710 may utilize a single antenna or a set of antennas.

UE communications manager 715 may be an example of aspects of the UE communications manager 615 described with reference to FIG. 6. UE communications manager 715 may also include determining component 730. The determining component 730 may detect a co-existence issue.

Transmitter 720 may transmit signals generated by other components of the device. In some examples, the transmitter 720 may be collocated with a receiver 710 in a transceiver module. The transmitter 720 may utilize a single antenna or a set of antennas. The transmitter 720 may transmit a message to network to mitigate co-existence issues.

Figure 8:
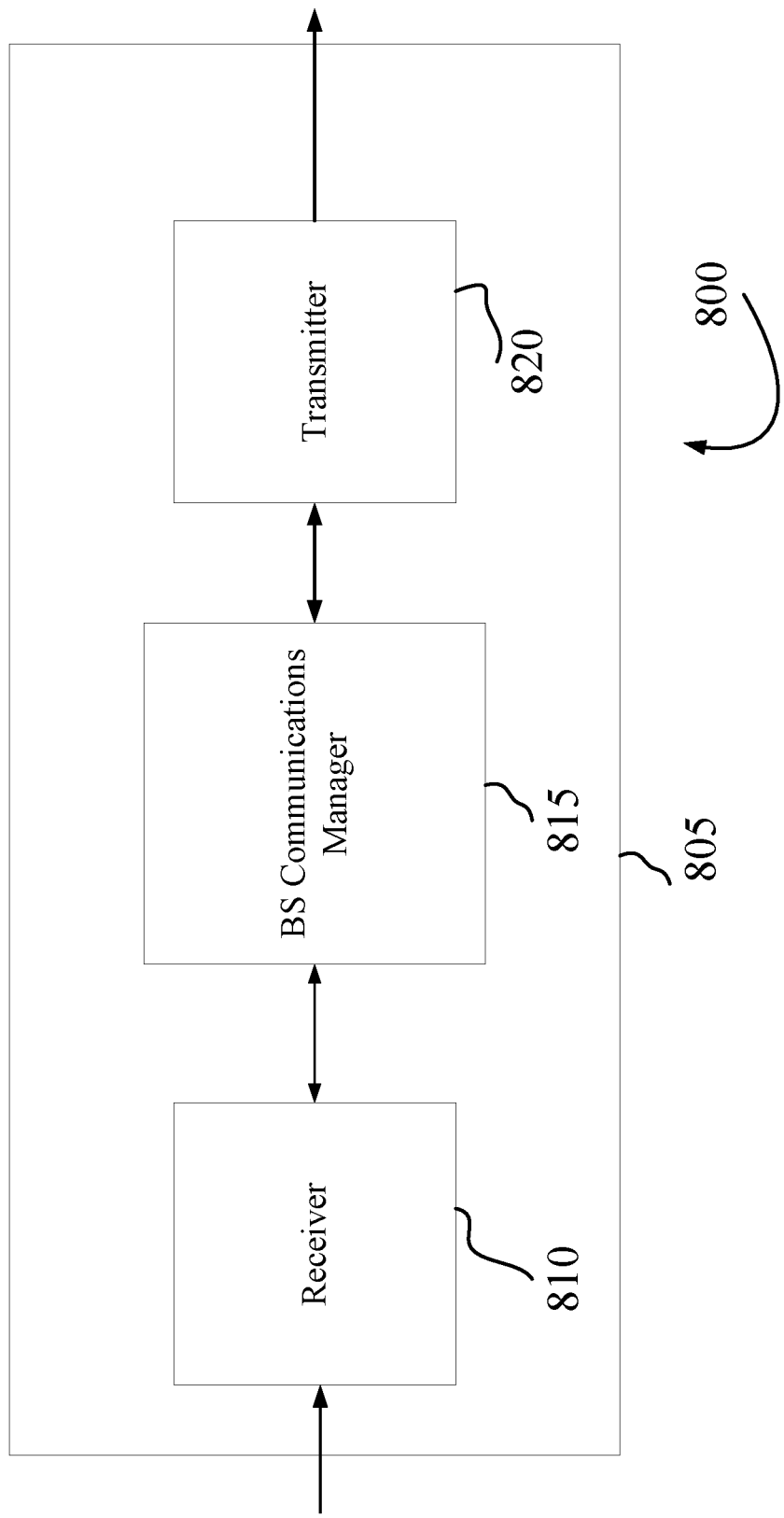
FIG. 8 illustrates a block diagram of a system including a base station that supports techniques for mitigating co-existence issues in communications systems in accordance with aspects of the present disclosure.

FIG. 8 shows a block diagram 800 of a wireless device 805 that supports techniques for mitigating co-existence issues in communications systems in accordance with aspects of the present disclosure. Wireless device 805 may be an example of aspects of a base station 110, 112, 114, etc as described in FIG. 1. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, throughput indicators, or control information associated with various information channels (e.g., control channels, data channels, throughput indicators, priority indicator, etc.) Information may be passed on to other components of the device. The receiver 810 may utilize a single antenna or a set of antennas.

Receiver 810 may determine an inter-modulation distortion value between communications on a first configuration of a first radio access network and communications on a second configuration of a second radio access network when transmissions occur at the same period of time on the first radio access network and the second radio access network, and dynamically switch between a non-standalone mode and a standalone mode of operation based on the inter-modulation distortion value and a quality of service requirement for the standalone mode, etc.

Base station communications manager 815 may be an example of aspects of the base station communications manager 915 described with reference to FIG. 9. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may receive signals not to invoke a particular band or to invoke a particular band. Transmitter 820 may determine an inter-modulation distortion value between communications on a first configuration of a first radio access network and communications on a second configuration of a second radio access network when transmissions occur at the same period of time on the first radio access network and the second radio access network, and determine to dynamically switch between a non-standalone mode and a standalone mode of operation based on the inter-modulation distortion value and a quality of service requirement for the standalone mode. In some examples, the transmitter 820 may be collocated with a receiver 810 in a transceiver module. The transmitter 820 may utilize a single antenna or a set of antennas.

Figure 9:
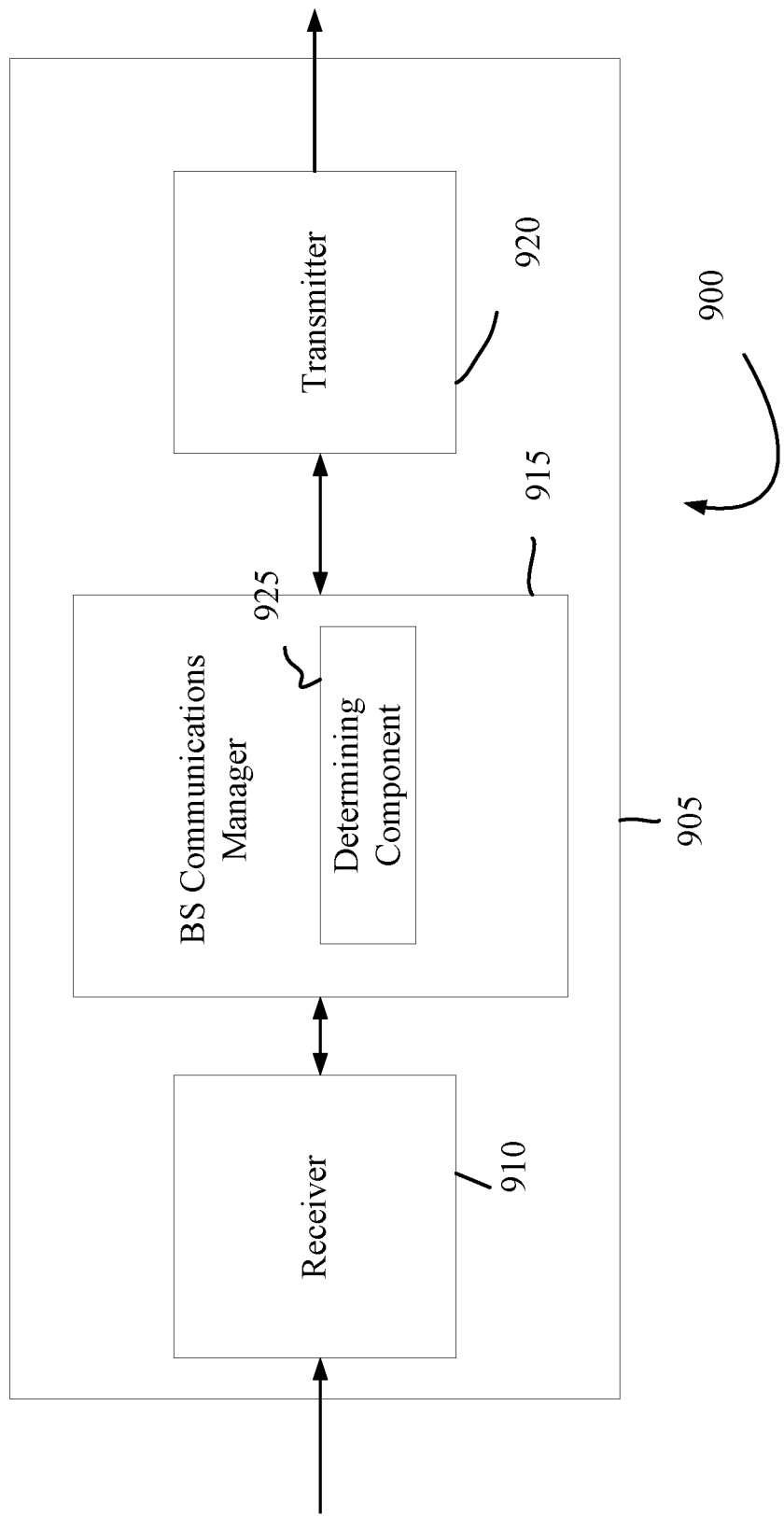
FIG. 9 illustrates a block diagram of a system including a base station that supports techniques for mitigating co-existence issues in communications systems in accordance with aspects of the present disclosure.

FIG. 9 shows a block diagram 900 of a wireless device 905 that supports techniques for mitigating co-existence issues in communications systems in accordance with aspects of the present disclosure. Wireless device 905 may be an example of aspects of a base station 110, 112, 114, etc as described with reference to FIG. 1. Wireless device 905 may include receiver 910, base station communications manager 915, and transmitter 920. Wireless device 905 may also include a processor. Each of these components may be in communication with one another (e.g., via one or more buses).

BS communications manager 915 and/or at least some of its various sub-components may be implemented in hardware, software executed by a processor, firmware, or any combination thereof. If implemented in software executed by a processor, the functions of the BS communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The BS communications manager 915 and/or at least some of its various sub-components may be physically located at various positions, including being distributed such that portions of functions are implemented at different physical locations by one or more physical devices. In some examples, BS communications manager 915 and/or at least some of its various sub-components may be a separate and distinct component in accordance with various aspects of the present disclosure. In other examples, BS communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

BS communications manager 915 may determine an inter-modulation distortion value between communications on a first configuration of a first radio access network and communications on a second configuration of a second radio access network when transmissions occur at the same period of time on the first radio access network and the second radio access network. BS communications manager 915 may include determining component 925. Determining component 925 may determine to dynamically switch between a non-standalone mode and a standalone mode of operation based on the inter-modulation distortion value and a quality of service requirement for the standalone mode.

Transmitter 920 may transmit signals generated by other components of the device. In some examples, the transmitter 920 may be collocated with a receiver 910 in a transceiver module. The transmitter 920 may utilize a single antenna or a set of antennas. Transmitter 920 may transmit to a receiving device in accordance with received priority indication information.

Figure 10:
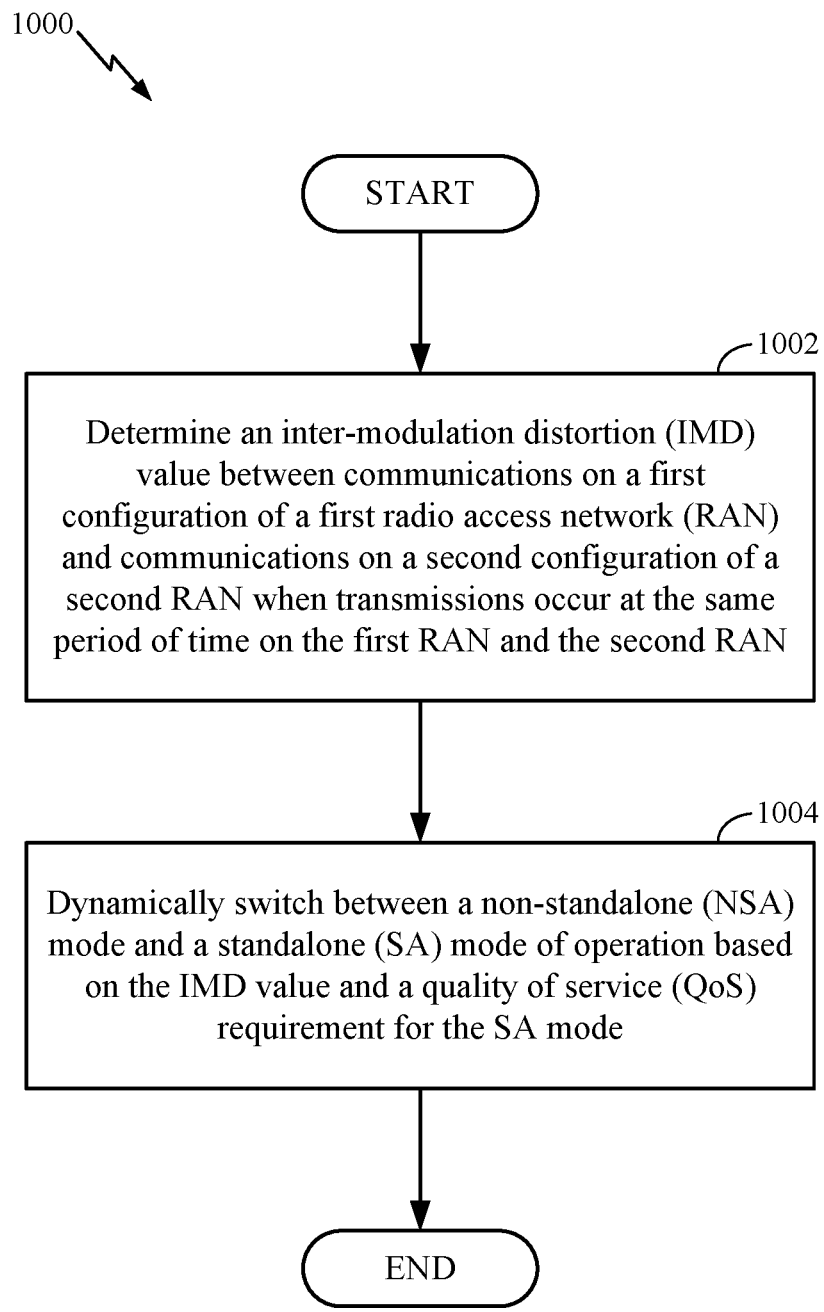
FIG. 10 is a is a flow chart illustrating an exemplary process that supports techniques for mitigating co-existence issues in communications systems in accordance with aspects of the present disclosure.

FIG. 10 is a flow chart illustrating an exemplary process 1000 for mitigating co-existence issues in communications systems, in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 200 illustrated in FIG. 2. In some examples, the process 1000 may be carried out by any suitable apparatus or means for carrying out the functions or algorithm described below.

At block 1002, the scheduling entity (e.g., base station or eNB) may determine intermodulation distortion between communications on a first configuration of a first radio access network and communications on a second configuration of a second RAN when transmissions occur at the same time on the first RAN and the second RAN. In one example, the first configuration may be set of frequencies operating on a band of a 4G anchor network, and the second configuration may be a set of frequencies operating on a second band of an NR network. At block 1004, the scheduling entity may determine to dynamically switch between a NSA and a SA mode of operation based on the IMD value and a quality of service requirement for the SA mode. In one example, the dynamic switch may be performed without a loss in connectivity.

Figure 11:
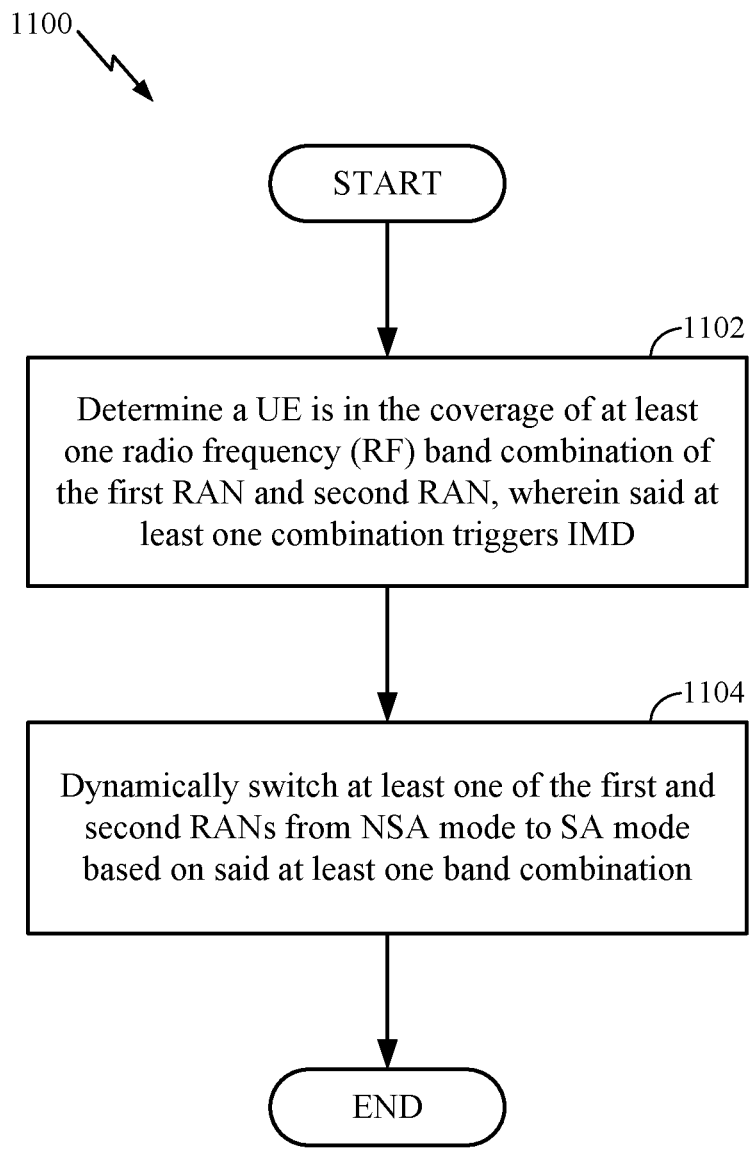
FIG. 11 is a flow chart illustrating another exemplary process that supports techniques for mitigating co-existence issues in communications systems in accordance with aspects of the present disclosure.

FIG. 11 is a flow chart illustrating an exemplary process 1100 for mitigating co-existence issues in communications systems, in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 200 illustrated in FIG. 2. In some examples, the process 1100 may be carried out by any suitable apparatus or means for carrying out the functions or algorithm described below.

At block 1102, the scheduling entity (e.g., base station or eNB) may determine a UE is in the coverage of at least one radio frequency band combination of a first RAN and a second RAN, wherein said at least one combination triggers IMD. At block 1104, the scheduling entity may determine to dynamically switch at least on of the first and second RANs from NSA mode to SA mode based on said at least one band combination. In one example, the dynamic switch may be performed without a loss in connectivity.

Figure 12:
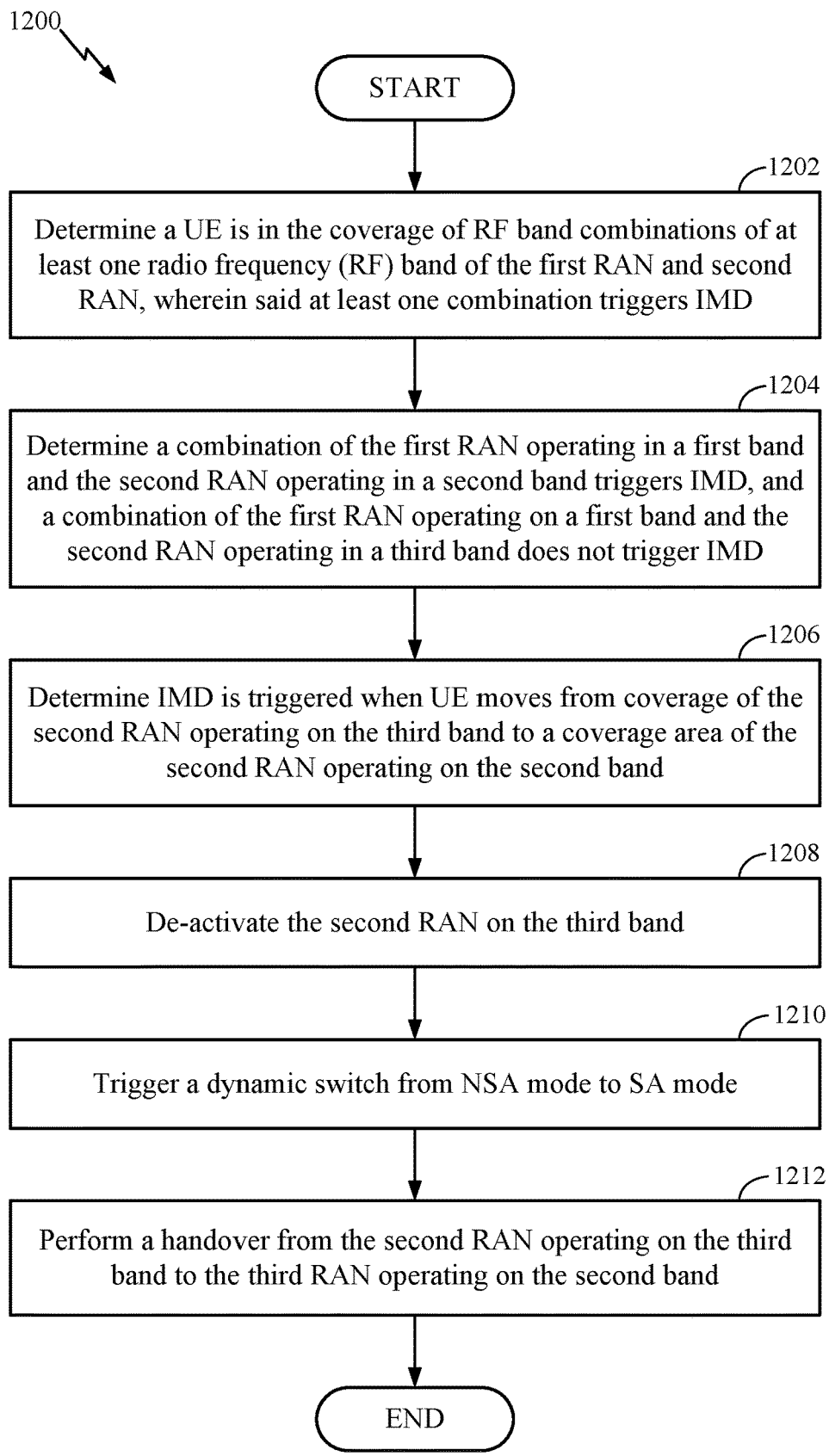
FIG. 12 is a flow chart illustrating another exemplary process that supports techniques for mitigating co-existence issues in communications systems in accordance with aspects of the present disclosure.

FIG. 12 is a flow chart illustrating an exemplary process 1200 for mitigating co-existence issues in communications systems, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 200 illustrated in FIG. 2. In some examples, the process 1200 may be carried out by any suitable apparatus or means for carrying out the functions or algorithm described below.

At block 1202, the scheduling entity (e.g., base station or eNB) may determine a UE is in the coverage of at least one radio frequency band combination of a first RAN and a second RAN, wherein said at least one combination triggers IMD. At block 1204, the scheduling entity may determine a combination of the first RAN operating in a first band and the second RAN operating in a second band triggers IMD, and a combination of the first RAN operating on a first band and the second RAN operating on a third band does not trigger IMD. At block 1206, the scheduling entity may determine IMD is triggered when the UE moves from coverage of the second RAN operating on the third band to a coverage area of the second RAN operating on the second band. At block 1208, the scheduling entity may de-activate the second RAN on the third band. At block 1210, the scheduling entity may trigger a dynamic switch from NSA mode to SA mode and at block 1212, the scheduling entity may perform a handover from the second RAN operating on the third band to the third RAN operating on the second band. In one example, the dynamic switch may be performed without a loss in connectivity.

Figure 13:
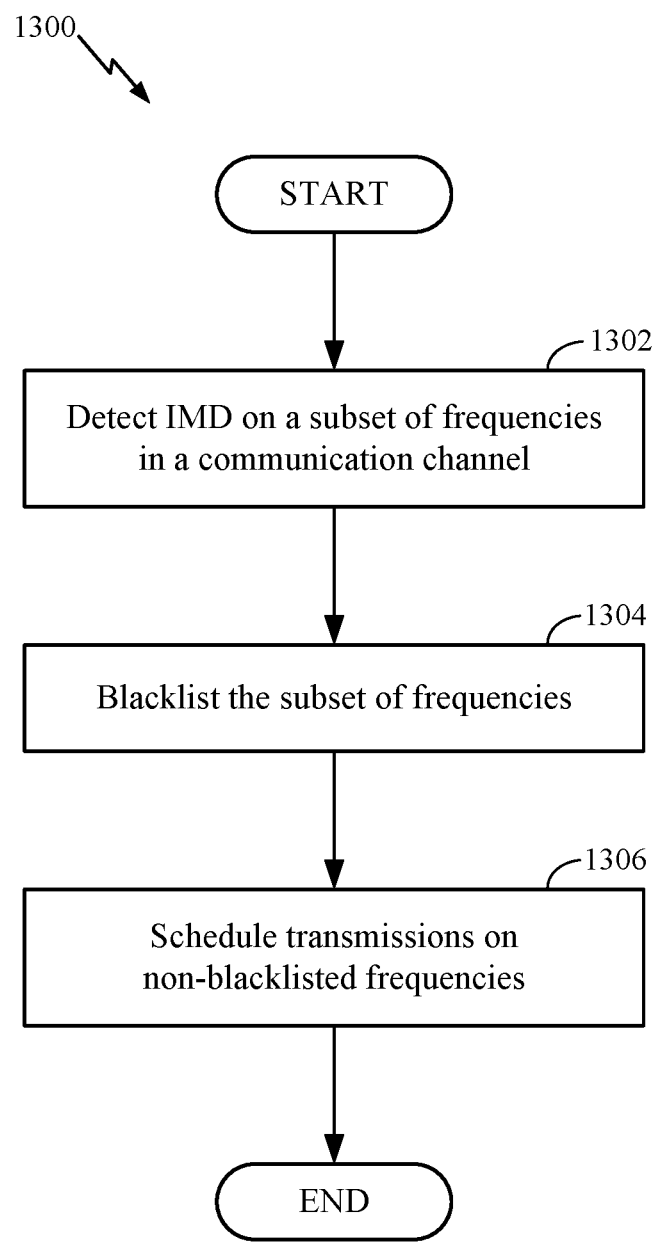
FIG. 13 is a flow chart illustrating another exemplary process that supports techniques for mitigating co-existence issues in communications systems in accordance with aspects of the present disclosure.

FIG. 13 is a flow chart illustrating an exemplary process 1300 for mitigating co-existence issues in communications systems, in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 200 illustrated in FIG. 2. In some examples, the process 1300 may be carried out by any suitable apparatus or means for carrying out the functions or algorithm described below.

At block 1302, the scheduling entity (e.g., base station or eNB) may detect IMD on a subset of frequencies in a communication channel. At block 1304, the scheduling entity may blacklist the subset of frequencies, and at block 1306, the scheduling entity may schedule transmissions on non-blacklisted frequencies.

Figure 14:
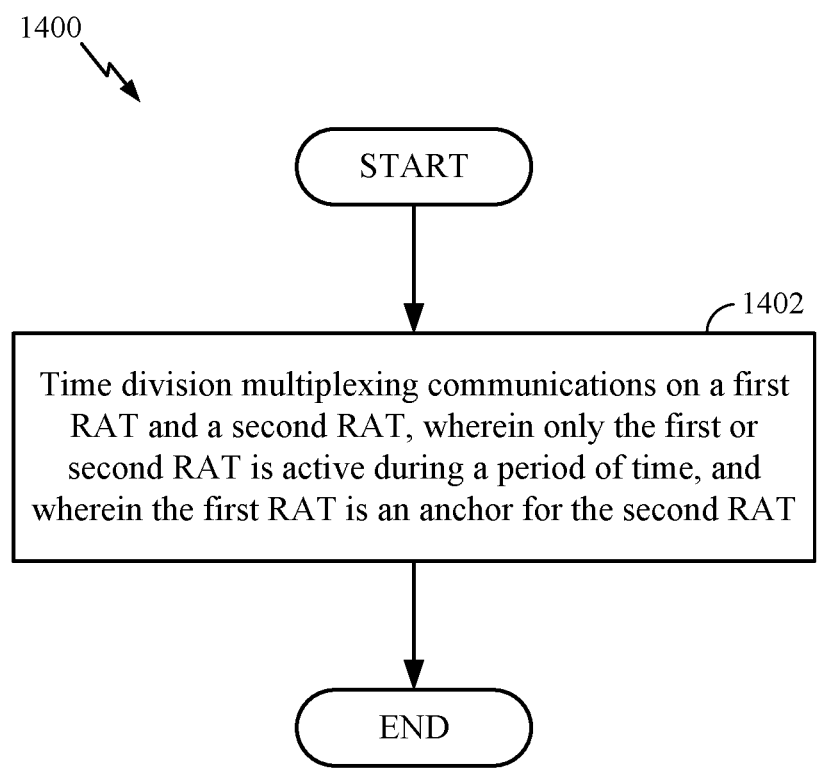
FIG. 14 is a flow chart illustrating another exemplary process that supports techniques for mitigating co-existence issues in communications systems in accordance with aspects of the present disclosure.

FIG. 14 is a flow chart illustrating an exemplary process 1400 for mitigating co-existence issues in communications systems, in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 200 illustrated in FIG. 2. In some examples, the process 1400 may be carried out by any suitable apparatus or means for carrying out the functions or algorithm described below.

At block 1402, the scheduling entity (e.g., base station or eNB) may perform time division multiplexing of communications on a first RAT and a second RAT, wherein only the first or second RAT is active during a period of time, and wherein the first RAT is an anchor for the second RAT.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising:
   determining an inter-modulation distortion (IMD) value between communications on a first configuration of a first radio access network (RAN) and communications on a second configuration of a second RAN when transmissions occur simultaneously on the first RAN and the second RAN; and
   dynamically switching between a non-standalone (NSA) mode and a standalone (SA) mode of operation of at least one of the first and second RANs, wherein the switching is based on the IMD value and a quality of service (QoS) requirement for the SA mode.

2. The method of claim 1, wherein the first configuration of the first RAN comprises a band configuration that is different from a band configuration of the second RAN.

3. The method of claim 2, wherein the first configuration of the first RAN communicates on a frequency division duplex (FDD) band and the second configuration of the second RAN communicates on a time division duplex (TDD) band.

4. The method of claim 2, wherein voice is communicated on the first configuration of the first RAN and data is communicated on the second configuration of the second RAN.

5. The method of claim 2, wherein signaling data is communicated on the first configuration of the first RAN and high rate data is communicated on the second configuration of the second RAN.

6. The method of claim 2, further comprising:
   detecting a UE is in the coverage of at least one radio frequency (RF) band combination of the first RAN and second RAN, wherein said at least one combination triggers IMD; and
   dynamically switching at least one of the first and second RANs from NSA mode to SA mode based on said detecting.

7. The method of claim 6, wherein a serving frequency is on a first band of the first RAN, further comprising:
   determining a UE is in the coverage of a second band of the second RAN;
   triggering a dynamic switch of the second network from NSA mode to SA mode; and
   performing handover from the serving frequency of the first band of the first RAN to a serving frequency of the second band of the second RAN.

8. The method of claim 7, further comprising:
   determining the UE has moved to the first band of the first RAN;
   performing a handover from the second band of the second RAN to the first band of the first RAN; and
   triggering a dynamic switch of the second RAN from SA mode to NSA mode.

9. The method of claim 2, further comprising blacklisting RF band combinations of the first RAN and the second RAN that trigger IMD, wherein said blacklisting comprises suspending communication on the blacklisted RF band combinations.

10. The method of claim 1, wherein dynamic switching between NSA mode and SA mode does not require a UE to detach from a NSA radio access network and re-attach in SA mode.

11. The method of claim 1, further comprising:
    determining a UE is in the coverage of RF band combinations of at least one radio frequency (RF) band of the first RAN and second RAN, wherein said at least one combination triggers IMD;
    determining a combination of the first RAN operating in a first band and the second RAN operating in a second band triggers IMD, and a combination of the first RAN operating on a first band and the second RAN operating in a third band does not trigger IMD;
    determining IMD is triggered when UE moves from coverage of the second RAN operating on the third band to a coverage area of the second RAN operating on the second band;
    de-activating the second RAN on the third band;
    triggering a dynamic switch from NSA mode to SA mode; and
    performing a handover from the second RAN operating on the third band to the third RAN operating on the second band.

12. The method of claim 11, further comprising:
    determining the UE has re-entered coverage of the second RAN operating on the third band and the first RAN remains in coverage of the first band;
    performing handover from the second RAN operating on the third band to the first RAN operating on the first band;
    performing a dynamic switch of the second RAN from SA mode to NSA mode; and
    configuring the second RAN on the third band.

13. The method of claim 12, further comprising:
    determining the UE has re-entered coverage of the second RAN operation on the third band and the first RAN remains in coverage of the first band;

performing handover of the second network from the second band to the third band of the second network; and performing a dynamic switch from SA mode to NSA mode with the first network operating as an anchor on the first band.

14. An apparatus for wireless communication comprising:
a processor;
memory in communication with the processor, and instructions stored in the memory and operable, when executed by the processor, to cause the apparatus to:
determine an inter-modulation distortion (IMD) value between communications on a first configuration of a first radio access network (RAN) and communications on a second configuration of a second RAN when transmissions occur simultaneously on the first RAN and the second RAN; and
dynamically switch between a non-standalone (NSA) mode and a standalone (SA) mode of operation of at least one of the first and second RANs, wherein the dynamically switching is based on the IMD value and a quality of service (QoS) requirement for the SA mode.

15. The apparatus of claim 14, wherein the first configuration of the first RAN comprises a band configuration that is different from a band configuration of the second RAN.

16. The apparatus of claim 15, wherein the first configuration of the first RAN communicates on a frequency division duplex (FDD) band and the second configuration of the second RAN communicates on a time division duplex (TDD) band.

17. The apparatus of claim 15, wherein signaling data is communicated on the first configuration of the first RAN and high rate data is communicated on the second configuration of the second RAN.

18. The apparatus of claim 15, wherein the processor is further configured to:
detect a UE is in the coverage of at least one radio frequency (RF) band combination of the first RAN and second RAN, wherein said at least one combination triggers IMD; and
dynamically switch at least one of the first and second RANs from NSA mode to SA mode based on said detecting.

19. The apparatus of claim 18, wherein a serving frequency is on a first band of the first RAN, wherein the processor is further configured to:
determine a UE is in the coverage of a second band of the second RAN;
trigger a dynamic switch of the second network from NSA mode to SA mode; and
perform handover from the serving frequency of the first band of the first RAN to a serving frequency of the second band of the second RAN.

20. The apparatus of claim 19, wherein the processor is further configured to:

determine the UE has moved to the first band of the first RAN;
perform a handover from the second band of the second RAN to the first band of the first RAN; and
trigger a dynamic switch of the second RAN from SA mode to NSA mode.

21. The apparatus of claim 15, wherein the processor is further configured to blacklist RF band combinations of the first RAN and the second RAN that trigger IMD, wherein said blacklisting comprises suspending communication on the blacklisted RF band combinations.

22. The apparatus of claim 14, wherein dynamic switching between NSA mode and SA mode does not require a UE to detach from a NSA radio access network and re-attach in SA mode.

23. The apparatus of claim 14, wherein the processor is further configured to:
determine a UE is in the coverage of RF band combinations of at least one radio frequency (RF) band of the first RAN and second RAN, wherein said at least one combination triggers IMD;
determine a combination of the first RAN operating in a first band and the second RAN operating in a second band triggers IMD, and a combination of the first RAN operating on a first band and the second RAN operating in a third band does not trigger IMD;
determine IMD is triggered when UE moves from coverage of the second RAN operating on the third band to a coverage area of the second RAN operating on the second band;
de-activate the second RAN on the third band;
trigger a dynamic switch from NSA mode to SA mode; and
perform a handover from the second RAN operating on the third band to the third RAN operating on the second band.

24. The apparatus of claim 23, wherein the processor is further configured to:
determine the UE has re-entered coverage of the second RAN operating on the third band and the first RAN remains in coverage of the first band;
perform handover from the second RAN operating on the third band to the first RAN operating on the first band;
perform a dynamic switch of the second RAN from SA mode to NSA mode; and
configuring the second RAN on the third band.

25. The apparatus of claim 24, wherein the processor is further configured to:
determine the UE has re-entered coverage of the second RAN operation on the third band and the first RAN remains in coverage of the first band;
perform handover of the second network from the second band to the third band of the second network; and
perform a dynamic switch from SA mode to NSA mode with the first network operating as an anchor on the first band.

* * * * *